United States Patent
Omura et al.

(10) Patent No.: US 9,661,278 B2
(45) Date of Patent: May 23, 2017

(54) IMAGING DEVICE, IMAGING SYSTEM, AND IMAGING METHOD

(71) Applicants: Keiji Omura, Kanagawa (JP); Kengo Yamamoto, Kanagawa (JP); Hiroko Mano, Tokyo (JP); Hirofumi Horikawa, Kanagawa (JP); Yusuke Ohta, Kanagawa (JP); Aiko Ohtsuka, Kanagawa (JP)

(72) Inventors: Keiji Omura, Kanagawa (JP); Kengo Yamamoto, Kanagawa (JP); Hiroko Mano, Tokyo (JP); Hirofumi Horikawa, Kanagawa (JP); Yusuke Ohta, Kanagawa (JP); Aiko Ohtsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 14/397,508

(22) PCT Filed: May 17, 2013

(86) PCT No.: PCT/JP2013/064422
§ 371 (c)(1),
(2) Date: Oct. 28, 2014

(87) PCT Pub. No.: WO2013/176237
PCT Pub. Date: Nov. 28, 2013

(65) Prior Publication Data
US 2015/0130946 A1 May 14, 2015

(30) Foreign Application Priority Data
May 21, 2012 (JP) ................................. 2012-115532

(51) Int. Cl.
*H04N 7/18* (2006.01)
*G03B 15/00* (2006.01)
(Continued)

(52) U.S. Cl.
CPC ............. *H04N 7/181* (2013.01); *G03B 15/00* (2013.01); *G03B 17/02* (2013.01); *G03B 17/56* (2013.01);
(Continued)

(58) Field of Classification Search
CPC ........ H03B 15/00; G03B 17/02; G03B 17/56; H04N 5/23206; H04N 5/247
See application file for complete search history.

(56) References Cited

U.S. PATENT DOCUMENTS 5,662,587 A 9/1997 Grundfest et al.
5,721,720 A 2/1998 Kikuchi et al.
(Continued)

FOREIGN PATENT DOCUMENTS

DE 202011105267 U1 1/2012
JP H02-097724 U 8/1990
(Continued)

OTHER PUBLICATIONS

International Search Report Issued on Jun. 18, 2013 in PCT/JP2013/064422 filed on May 17, 2013.
(Continued)

*Primary Examiner* — Tat Chio
(74) *Attorney, Agent, or Firm* — IPUSA, PLLC

(57) ABSTRACT

An imaging device includes an imaging unit configured take a plurality of images, the imaging unit including a plurality of imaging parts each configured to acquire an imaging data item relevant to one of the plurality of images taken, and a wiring part configured to transmit a plurality of the imaging data items acquired by the plurality of imaging parts. The wiring part includes an external part forming an outline of the wiring part, and a cable part disposed inside the external part. The plurality of imaging parts are disposed along a longitudinal direction of the wiring part, and the imaging
(Continued)

unit is configured to acquire the plurality of the imaging data items corresponding to a plurality of imaging positions, and transmit the plurality of the imaging data items by using the cable part.

12 Claims, 16 Drawing Sheets

(51) Int. Cl.
| | | |
|---|---|---|
| *H04N 5/232* | (2006.01) | |
| *H04N 5/247* | (2006.01) | |
| *G03B 17/02* | (2006.01) | |
| *G03B 17/56* | (2006.01) | |
| *H02G 3/04* | (2006.01) | |
| *G08B 13/196* | (2006.01) | |

(52) U.S. Cl.
  CPC ......... *H04N 5/23206* (2013.01); *H04N 5/247* (2013.01); *G08B 13/19665* (2013.01); *H02G 3/0481* (2013.01)

(56) References Cited

U.S. PATENT DOCUMENTS

| | | | |
|---|---|---|---|
| 7,239,345 B1 | 7/2007 | Rogina | |
| 7,498,814 B1* | 3/2009 | Huang | G01R 33/3815 324/318 |
| 8,558,882 B1* | 10/2013 | Kotab | H04N 5/2252 348/82 |
| 2003/0016288 A1* | 1/2003 | Kaylor | H04N 7/181 348/149 |
| 2005/0085731 A1* | 4/2005 | Miller | A61B 8/12 600/459 |
| 2006/0023114 A1 | 2/2006 | Shibuya et al. | |
| 2006/0115265 A1 | 6/2006 | Elberbaum | |
| 2007/0130600 A1 | 6/2007 | Yanai | |
| 2012/0053407 A1 | 3/2012 | Levy | |
| 2012/0113215 A1* | 5/2012 | Tao | F16M 11/12 348/37 |

FOREIGN PATENT DOCUMENTS

| | | |
|---|---|---|
| JP | H06-105201 | 4/1994 |
| JP | H08-214388 | 8/1996 |
| JP | H09-092041 | 4/1997 |
| JP | H10-304346 | 11/1998 |
| JP | 2000-070221 | 3/2000 |
| JP | 2000-125157 | 4/2000 |
| JP | 2001-045345 | 2/2001 |
| JP | 2002-034032 | 1/2002 |
| JP | 2003-278961 | 10/2003 |
| JP | 2004-128646 | 4/2004 |
| JP | 2004-328785 | 11/2004 |
| JP | 2005-277698 | 10/2005 |
| JP | 2005-303793 | 10/2005 |
| JP | 2006-049990 | 2/2006 |
| JP | 2006-262133 | 9/2006 |
| JP | 2007-158552 | 6/2007 |
| JP | 2007-180985 | 7/2007 |
| JP | 2007-264513 | 10/2007 |
| JP | 2009-017377 | 1/2009 |
| JP | 2009-141533 | 6/2009 |
| RU | 2158487 | 10/2000 |

OTHER PUBLICATIONS

Japanese Office Action dated Mar. 8, 2016.
Extended European Search Report dated Dec. 22, 2015.
Russian Office Action dated Oct. 14, 2015.
Russian Office Action dated Jun. 25, 2015.
Japanese Office Action dated Sep. 6, 2016.
Japanese Office Action for 2012-115532 mailed on Mar. 7, 2017.

* cited by examiner

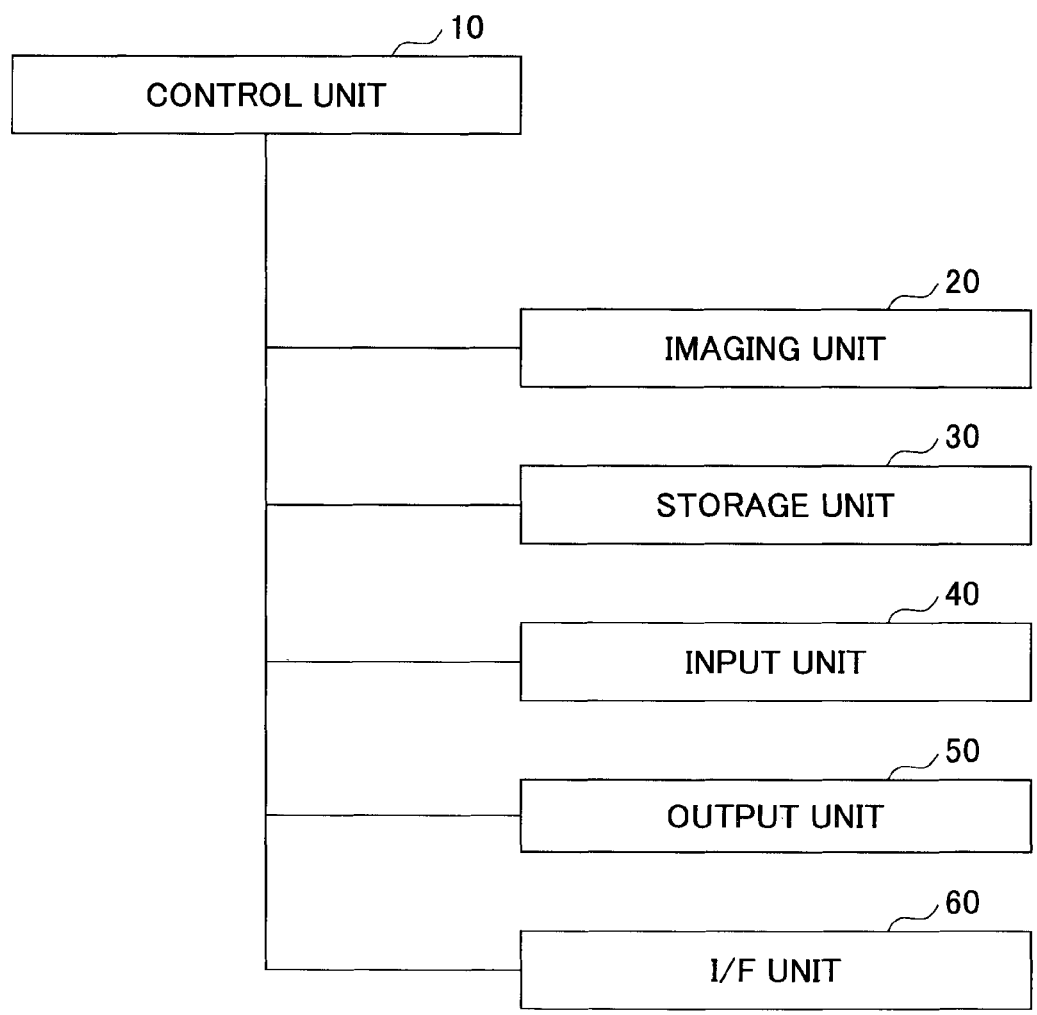

FIG.13A

| YEAR/MONTH/DATE | [ ] YEAR | [ ] MONTH | [ ] DATE |
|---|---|---|---|
| TIME | [ ] TIME | [ ] MINUTE | [ ] SECOND |
| FRONT AND BACK RANGE | [ ] SECOND | | |

[ SEE PAST IMAGE ]  [ CANCEL ]

| YEAR/MONTH/DATE | 2012 YEAR | 04 MONTH | 25 DATE |
|---|---|---|---|
| TIME | 12 TIME | 34 MINUTE | 56 SECOND |
| FRONT AND BACK RANGE | 37 SECOND | | |

[ SEE PAST IMAGE ]  [ CANCEL ]

| 1 | 2 | 3 | 4 | ... | 10 |

[ ■ ] [ ◀◀ ] [ ▶ ] [ ▶▶ ]

51E3c(51)

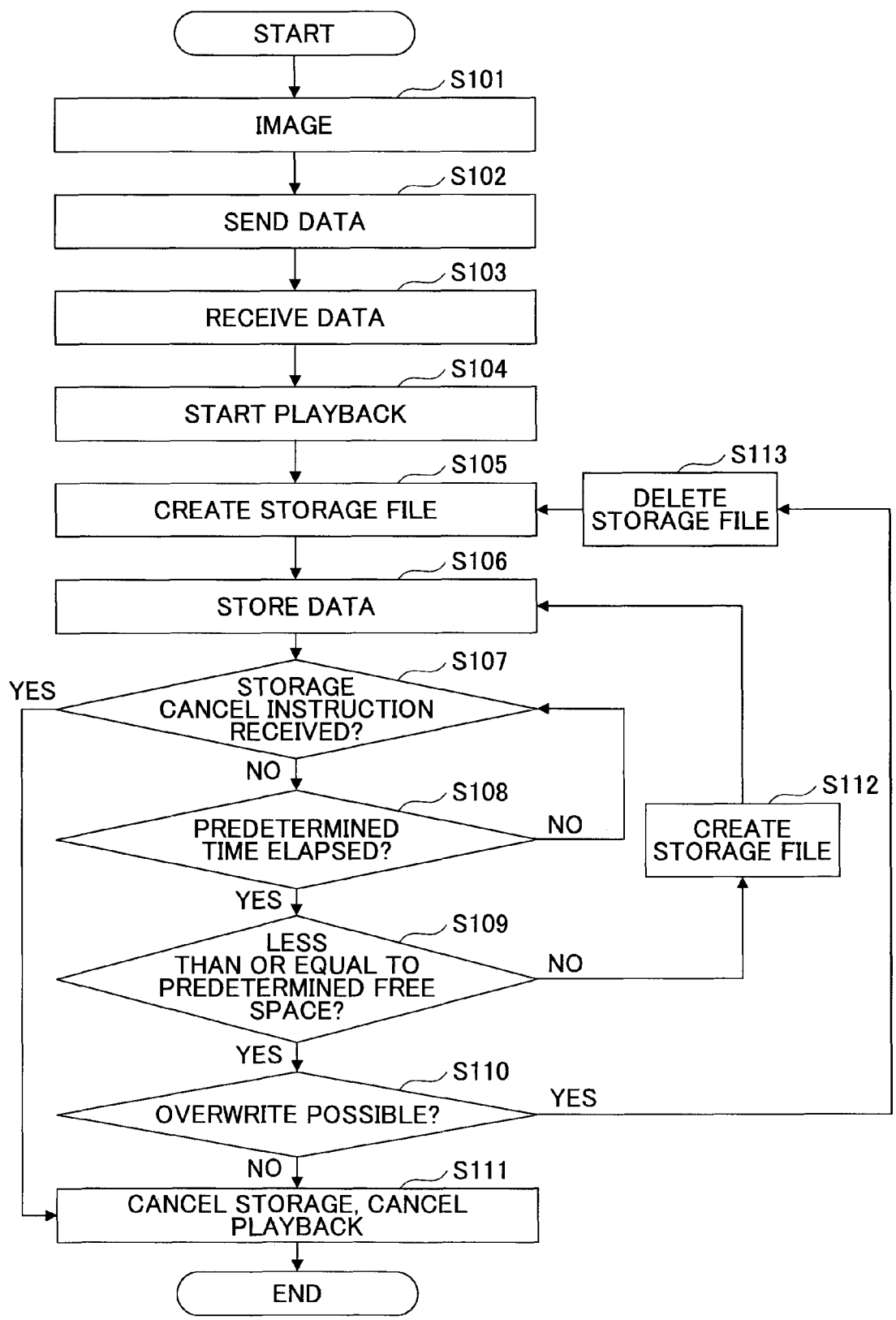

IMAGING DEVICE, IMAGING SYSTEM, AND IMAGING METHOD

TECHNICAL FIELD

The present invention relates to an imaging device, an imaging system, and an imaging method.

BACKGROUND ART

There is an imaging device for forming, on an imaging element (for example, an image sensor), an image of an area including an imaging target (photograph target), acquiring pixel output signals (electronic signals) of the imaging element as imaging data, and displaying an image by using the acquired imaging data.

Patent document 1 discloses a technology including a constant recording device (storage unit) for storing image information (imaging data) taken (photographed) by plural monitor cameras as recorded image information (image), and an aggregate recording device (storage unit) for storing the recorded image information as backup image information. Furthermore, patent document 1 discloses a technology of selecting necessary case image information (image) by sending particular recorded image information as case image information to the aggregate recording device based on a case generation signal and a case completion signal.

When taking plural images at plural positions, plural imaging parts (for example, plural cameras) need to be disposed. In this case, the locations (space) for disposing the imaging parts may be limited, and it is difficult to dispose the plural imaging parts.

Patent document 1 does not disclose a method of disposing plural imaging parts for acquiring imaging data relevant to plural images when taking plural images at plural positions.

Patent Document 1: Japanese Laid-Open Patent Application No. 2007-180985

DISCLOSURE OF INVENTION

The present invention has been made in view of the above-described problems, and it is an object of at least one embodiment of the present invention to provide an imaging device by which plural imaging parts can be disposed in accordance with plural imaging positions, in a case of taking plural images with plural imaging parts.

An aspect of the present invention provides an imaging device including an imaging unit configured take a plurality of images, the imaging unit including a plurality of imaging parts each configured to acquire an imaging data item relevant to one of the plurality of images taken, and a wiring part configured to transmit a plurality of the imaging data items acquired by the plurality of imaging parts, wherein the wiring part includes an external part forming an outline of the wiring part, and a cable part disposed inside the external part, wherein the plurality of imaging parts are disposed along a longitudinal direction of the wiring part, and the imaging unit is configured to acquire the plurality of the imaging data items corresponding to a plurality of imaging positions, and transmit the plurality of the imaging data items by using the cable part.

An aspect of the present invention provides an imaging method including disposing a plurality of imaging parts in a longitudinal direction of a wiring part; changing a shape of the wiring part in the longitudinal direction in accordance with a plurality of imaging positions; acquiring a plurality of imaging data items by using the plurality of imaging parts; and transmitting the plurality of imaging data items that have been acquired by using a cable part built in the wiring part.

BRIEF DESCRIPTION OF DRAWINGS

FIG. 1 schematically illustrates an imaging device according to an embodiment of the present invention;

FIGS. 13A through 13C are schematic external views of a display unit of an imaging device according to example 3 of the present invention;

FIG. 16 is a flowchart of an operation of an imaging system according to example 4 of the present invention.

BEST MODE FOR CARRYING OUT THE INVENTION

Figure 2A:
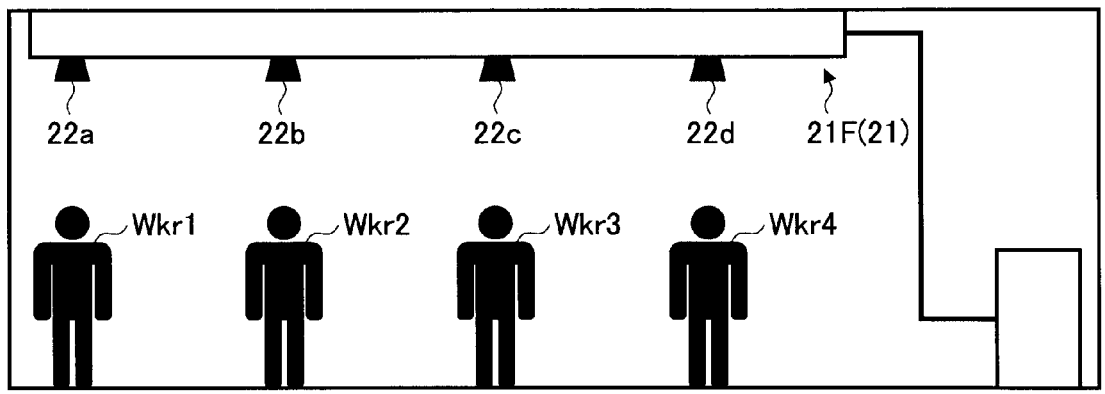
FIGS. 2A and 2B schematically illustrate an arrangement of an imaging device according to an embodiment of the present invention.

In an embodiment of the present invention, an imaging device including plural imaging parts is described. An embodiment of the present invention is applicable to a device other than the imaging device described below, such as a camera, a video camera, an imaging device, a monitor camera, and a recording camera, as long as plural areas (states of areas) can be acquired as plural images (device, unit, etc.). Furthermore, in the following description, taking an image means to take an image including still images and video images, and to acquire these images as data relevant to imaging, recording, and other images.

Configuration of Imaging Device

An imaging device 100 according to an embodiment of the present invention is described with reference to FIGS. 1 through 5C.

As shown in FIG. 1, the imaging device 100 according to an embodiment of the present invention includes a control unit 10, an imaging unit 20, a storage unit 30, an input unit 40, an output unit 50, and an I/F unit 60. The imaging device 100 generates an image based on imaging data obtained by taking an image of an area including a target (e.g., imaging target, photograph target, imaging area, and imaging range, hereinafter, "target"). Furthermore, the imaging device 100 displays the generated image.

The control unit 10 is for assigning operations to the respective elements in the entire imaging device 100, and controlling the operations of the elements. The control unit 10 controls operations of, for example, the imaging unit 20 by using programs stored in the storage unit 30 described below. Furthermore, the control unit 10 controls operations of, for example, the imaging unit 20 based on information input from the input unit 40 or the I/F unit 60 described below. Furthermore, the control unit 10 outputs information taken by the imaging unit 20 by using the output unit 50 described below.

The control unit 10 may include an image generating unit for generating images from the acquired imaging data.

The imaging unit 20 is for acquiring data (hereinafter, "imaging data") of images relevant to an area including the target. For example, the imaging unit 20 can form, on an imaging element (for example, an image sensor), an image of an area including a target, and acquire pixel output signals (electronic signals corresponding to the bright and dark portions of light) of the imaging element as imaging data. In the present embodiment, the imaging unit 20 includes plural imaging parts (22a through 22d in FIG. 2A) for acquiring plural imaging data items corresponding to positions for taking images (hereinafter, "imaging positions", and a wiring part (21 in FIG. 2A) for transmitting plural imaging data items acquired by the plural imaging parts.

The imaging parts 22a, etc., are for acquiring imaging data. The imaging unit 20 includes plural imaging parts 22a through 22d as shown in FIG. 2A.

Each of the plural imaging parts may include an imaging lens, an imaging element, and a signal processing substrate.

The imaging lens is for entering an image of the target in the imaging element. The imaging lens may be, for example, an optical lens. A plurality of imaging lenses may be included.

The imaging element is an element to which light that has been transmitted through the imaging lens is entered (radiated). The imaging element may include an acceptance surface on which multiple light receiving elements are arranged in a matrix. The imaging element forms, on the acceptance surface, an image of an area including the target, which has entered through the imaging lens. The imaging element may be, for example, a solid-state imaging element and an organic imaging element.

The signal processing substrate is for outputting pixel output signals output from the imaging element to the control unit 10, etc., via the wiring part 21. For example, the signal processing substrate adds, to the pixel output signals, information relevant to the position in the matrix of the acceptance surface, and outputs the pixel output signals. Furthermore, the signal processing substrate may add, to the pixel output signals, information relevant to the date, time, and/or position of taking the image, and output the pixel output signals.

FIG. 2A illustrates four imaging parts; however, the imaging unit applicable to an embodiment of the present invention is not limited to having four imaging parts. That is to say, the imaging unit may include less than or equal to three imaging parts or five or more imaging parts.

Figure 5A:
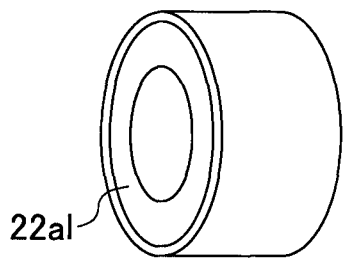
FIGS. 5A through 5C are schematic external views of imaging parts of an imaging unit of an imaging device according to an embodiment of the present invention.
Figure 5B:
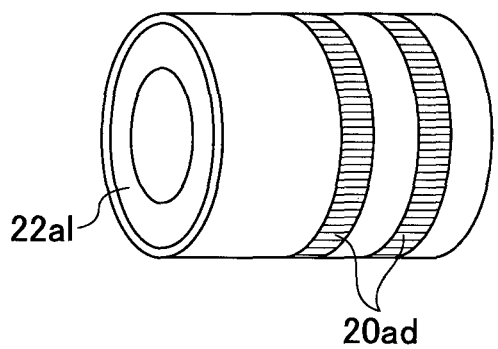
Figure 5C:
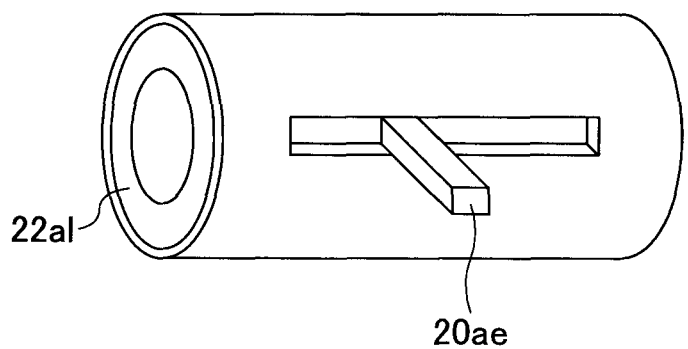

As shown in FIG. 5A, the imaging unit 20 may include an imaging part 22a1 without a focusing function or a magnifying function, as the imaging part 22a. Furthermore, as shown in FIGS. 5B and 5C, the imaging unit 20 may include, as the imaging part 22a, an imaging part having a dial type 20ad (FIG. 5B) focusing function and magnifying function, and an imaging part having a lever type 20ae (FIG. 5C) focusing function. The other imaging parts 22b-22d of the imaging unit 20 may also be imaging parts with or without the focusing function and/or the magnifying function.

The imaging unit 20 may realize an optical zoom mechanism by changing the relative positional relationships between the plural lenses included in the image part. The imaging unit 20 may implement automatic focusing and/or magnifying according to the control of the control unit 10.

The wiring part 21 (FIG. 2A) is for transmitting (outputting, etc.) the imaging data acquired by the imaging parts to the control unit 10 and/or the storage unit 30. The wiring part 21 includes an external part 21F (for example, FIG. 4A and FIG. 4B) forming the outline of the wiring part 21, and plural cable parts 21ac through 21dc (for example, FIG. 4A and FIG. 4B) disposed inside the external part 21F.

The external part 21F may have a tube-shaped cross-section. In the present embodiment, the external part 21F has a substantially cylindrical shape. The external part 21F may be, for example, a rubber tube, a steel tube, or a resin tube (for example, a tube made of thermoforming resin), equipped with plural cables (disposed, wired) inside. The shape of the external part 21F is not limited to a substantially cylindrical shape.

Figure 3A:
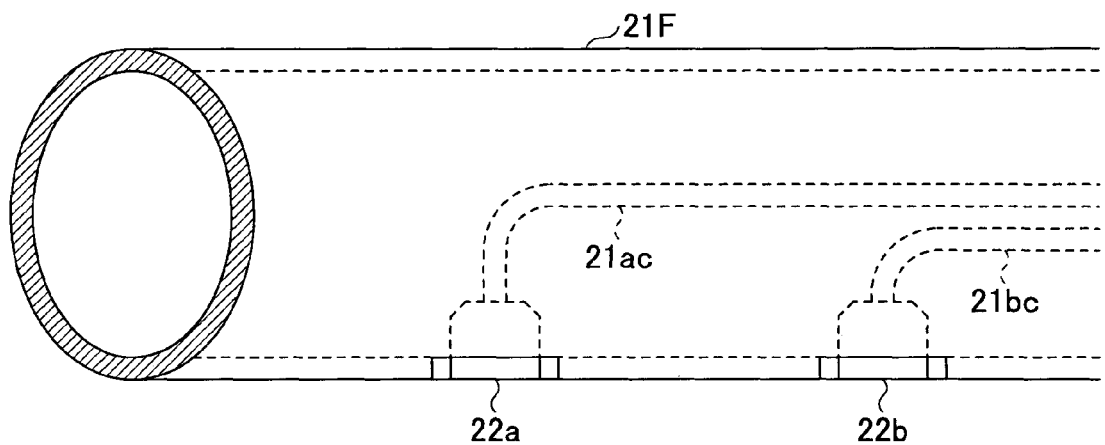
FIGS. 3A and 3B schematically illustrate an imaging unit of an imaging device according to an embodiment of the present invention.
Figure 3B:
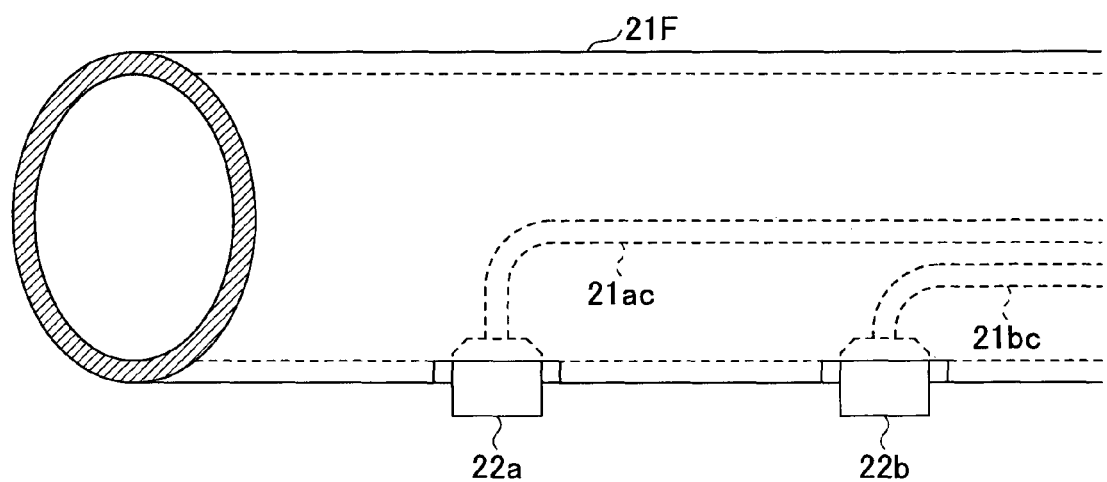

Furthermore, as shown in FIG. 3A, the external part 21F may have imaging parts 22a, etc., disposed inside. Accordingly, places for disposing the imaging unit 20 (imaging part 22a, etc.) are secured. Furthermore, in the imaging unit 20, the imaging parts 22a, etc., are disposed inside the external part 21F, and therefore the imaging parts are protected from the impact from outside. Furthermore, as shown in FIG. 3B, the imaging parts 22a, etc., may be disposed in a manner as to protrude outside from the outline surface of the external part 21F.

Figure 4A:
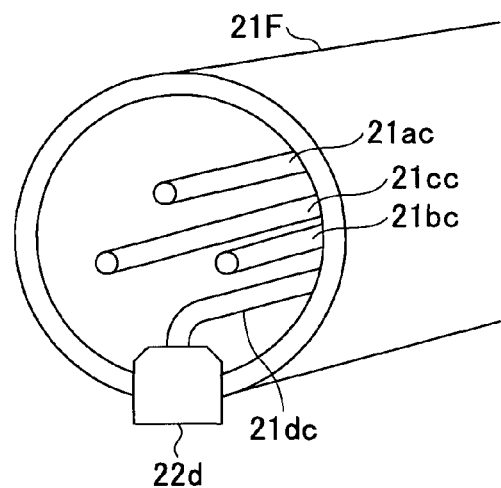
FIGS. 4A and 4B are schematic cross-sectional views of an imaging unit of an imaging device according to an embodiment of the present invention.
Figure 4B:
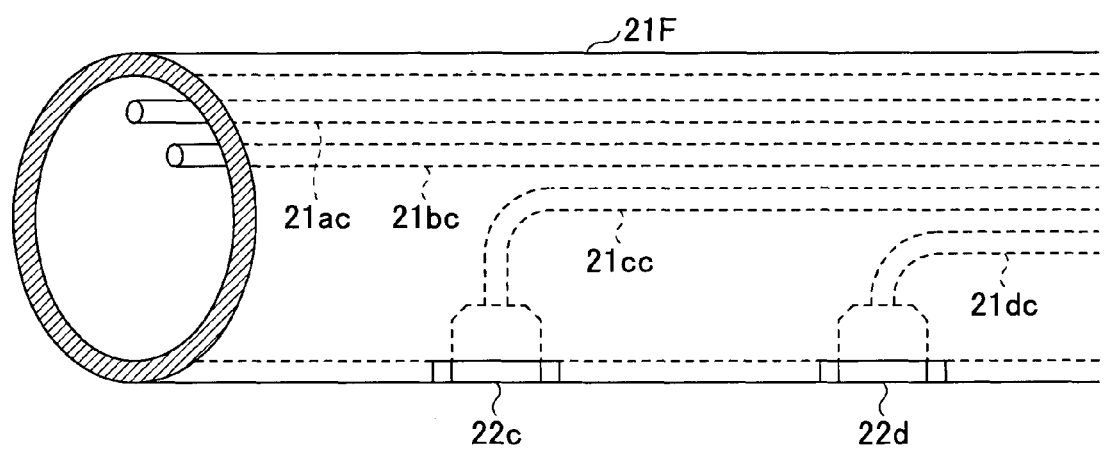

The cable part is for transmitting the imaging data acquired by the imaging part. In the present embodiment, the wiring part 21 includes plural cable parts 21ac-21dc corresponding to the plural imaging parts 22a-22d, as shown in FIGS. 4A and 4B. Furthermore, the plural cable parts 21ac-21dc are bound together and disposed inside the external part 21F.

The storage unit 30 is for storing the imaging data acquired by the imaging unit 20. The storage unit 30 can store programs (control program, application, etc.) needed for operating the imaging device 100, and operation conditions. Furthermore, the storage unit 30 stores information relevant to the processing state of the imaging device 100 when the imaging device 100 is operating or in a standby state. The storage unit 30 may be a storage unit of a known technology (hard disk, memory, ROM, RAM, etc.).

The input unit 40 is for receiving predetermined information (for example, imaging conditions, operation information, output conditions (display conditions, replay conditions) etc.) that is input to the imaging device 100 from outside the imaging device 100 by a user (a person taking an image, an administrator, an observer, hereinafter, "user"). The input unit 40 may be a keyboard, a touchpad (including a display part of the output unit 50, a mouse, and other user interfaces.

The output unit 50 can output (for example, display) predetermined information. For example, the output unit 50 can be a display part for outputting (displaying) information (images) relevant to the imaging data acquired by the control unit 10. That is to say, by viewing an image displayed on a display part of the output unit 50, the user can recognize the state of the area taken by the imaging device 100. The display part may be, for example, a liquid crystal monitor.

The I/F unit 60 is for performing input/output of information (for example, electrical signals) between the imaging device 100 and an external device. For example, the I/F unit 60 can output information (for example, images) relevant to imaging to an external device (a PC, etc.). Furthermore, the I/F unit 60 may output information stored in the storage unit 30 to an external device.

Disposing Imaging Unit of Imaging Device

With reference to FIGS. 2A, 2B, 4A, and 4B, a description is given of the disposing of the imaging unit 20 of the imaging device 100 according to an embodiment of the present invention. FIG. 2A illustrates a case where the imaging parts (for example, cameras) are attached to parts of the ceiling corresponding to the imaging positions. The imaging device to which an embodiment of the present invention is applicable may be attached to places other than the ceiling. Furthermore, in the imaging device to which an embodiment of the present invention is applicable, the imaging parts 22a-22d may be disposed at positions, corresponding to the imaging positions without deforming the wiring part 21.

AS shown in FIG. 2A, the imaging unit 20 of the imaging device 100 according to the present invention includes the imaging parts 22a through 22d. The imaging parts 22a-22d are disposed in the wiring part 21 (external part 21F). Therefore, in the imaging device 100, by deforming (wiring) the wiring part 21 in accordance to the imaging positions, the imaging parts 22a-22d can be moved (disposed) in accordance to the imaging positions.

Specifically, as shown in FIG. 4A and FIG. 4B, in the imaging device 100 according to the present embodiment, the plural imaging parts 22d, etc. are disposed in series in the longitudinal direction of the wiring part 21 by being spaced apart by predetermined intervals. Furthermore, in the imaging device 100, the plural cable parts 21ac-21dc corresponding to the plural imaging parts 22d, etc. are disposed inside the external part 21F so that the cable parts can be bound together. Furthermore, in the imaging device 100, by binding together these plural cable parts 21ac-21dc, the plural cable parts may be regarded as a single cable part.

Accordingly, in the imaging device 100 according to the present embodiment, by changing the shape of (deforming) the external part 21F of the wiring part 21 in the longitudinal direction, the plurality of the imaging parts 22a-22d can be disposed at (moved to) positions corresponding to the imaging positions. Furthermore, in the imaging device 100, the cable parts 21ac-21dc of the wiring part 21 are used to output, to the storage unit 30, a plurality of imaging data items acquired by the plurality of imaging parts.

Furthermore, when an embodiment of the present invention is used at the site of a production line, the external part 21F of the wiring part 21 can be deformed in accordance with the locations of workers Wkr1 through Wkr4. Thus, by the imaging device 100 according to the present embodiment, even in a case where the entire imaging area cannot be imaged (photographed) with a single imaging part (camera), a plurality of imaging parts can be disposed continually (by a certain degree). Therefore, the entire imaging area can be completely imaged. Furthermore, the operational manager of the production line can easily recognize the contents of the image corresponding to the imaged position (the state of the imaged area) by using the image taken, and therefore the operational manager can easily acquire information relevant to subsequent quality improvement activities.

Figure 2B:
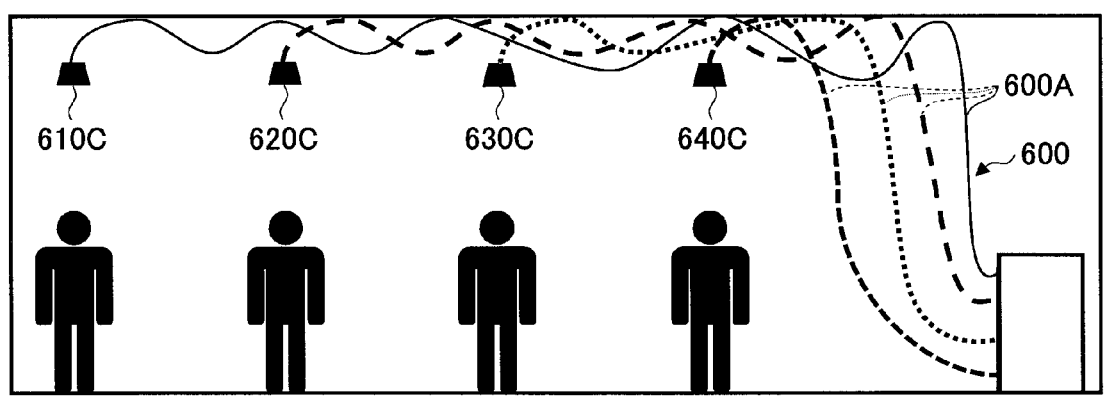

FIG. 2B illustrates another example (wiring example) of the imaging unit of the imaging device. In the example of FIG. 2B, the wiring parts are respectively separately connected to a plurality of imaging parts to form the wiring.

As shown in FIG. 2B, in this other example of wiring, wiring parts 600A (plural wirings) are separately wired to a plurality of imaging parts 610C through 6400. Therefore, in this other example of FIG. 2B, compared to the embodiment shown in FIG. 2A, more time is required for installing an imaging device 600 (imaging means), because plural wiring parts 600A are separately connected to the plural imaging parts 610C-640C. Furthermore, in this other example of FIG. 2B, compared to the embodiment shown in FIG. 2A, more space may be required for installing the imaging device 600, because the plural wiring parts 600A are separately connected to the corresponding plural imaging parts 610C-640C. Furthermore, in this other example of FIG. 2B, compared to the embodiment shown in FIG. 2A, when all of the imaging positions of the imaging parts 610C-640C are to be changed at once, the imaging parts have to be separately moved one by one, which may take more time for changing the positions, because the plural wiring parts 600A are separately connected to the corresponding plural imaging parts 610C-640C.

Program and Recording Medium Recording the Program

A program Pr according to an embodiment of the present invention executes a disposing step of disposing a plurality of imaging parts in a longitudinal direction of a wiring part and changing the shape of the wiring part in the longitudinal direction in accordance with the plural imaging positions; an imaging step of acquiring a plurality of imaging data items using the plural imaging parts; and a transmitting step of respectively transmitting the acquired plurality of imaging data items with the use of cable parts built in the wiring part. According to this configuration, the same effects as the imaging device 100 according to an embodiment of the present invention can be achieved. Furthermore, the program Pr according to an embodiment of the present invention may further execute a display step of displaying an image corresponding to an imaging position that has been imaged, based on the imaging data acquired by the imaging part. Furthermore, in the display step, the program Pr according to an embodiment of the present invention may display, on the display unit, a plurality of the images disposed in accordance with a plurality of the imaging positions. In the disposing step, the program Pr according to an embodiment of the present invention may dispose the plurality of imaging parts in accordance with the plurality of imaging positions, without deforming the wiring unit.

Furthermore, a program Pr according to an embodiment of the present invention executes a disposing step of disposing a plurality of imaging parts in a longitudinal direction of a wiring part and changing the shape of the wiring part in the longitudinal direction in accordance with the plural imaging positions; an imaging step of acquiring a plurality of imaging data items using the plural imaging parts; a transmitting step of respectively transmitting the acquired plurality of imaging data items with the use of cable parts built in the wiring part; and further executes a selecting step of selecting an arbitrary image among a plurality of images displayed at the display step. In the display step, the image selected at the selecting step may be further displayed. Furthermore, the program Pr further executes a storage step of storing the imaging data acquired by the imaging part, and in the display step, the imaging data stored at the storage step may be used to display the image. Furthermore, in the selecting step, among the plurality of imaging data items stored at the storage step, an image relevant to imaging data corresponding to an arbitrary date and/or period may be selected.

Furthermore, a program Pr according to an embodiment of the present invention executes a disposing step of disposing a plurality of imaging parts in a longitudinal direction of a wiring part and changing the shape of the wiring part in the longitudinal direction in accordance with the plural imaging positions; an imaging step of acquiring a plurality of imaging data items using the plural imaging parts; a transmitting step of respectively transmitting the acquired plurality of imaging data items with the use of cable parts built in the wiring part; and further executes a display step of displaying an image corresponding to an imaging position that has been imaged, based on the imaging data acquired by the imaging part. In the display step, imaging data may be received in a wired and/or wireless manner. Furthermore, the display step may include receiving the imaging data in time series, and displaying the images corresponding to the received imaging data items in time series.

According to the configuration of the program Pr, the same effects as the imaging device 100 according to an embodiment of the present invention can be achieved.

Furthermore, an embodiment of the present invention may be a computer-readable recording medium Md recording the program Pr. As the recording medium Md recording the program Pr, a computer-readable medium such as a flexible disk, a CD-ROM, and a memory card may be used.

As described above, in the imaging device 100 according to an embodiment of the present invention, a plurality of cable parts 21ac, etc., Corresponding to a plurality of imaging parts 22a, etc.; can be disposed inside the external part 21F of the wiring part 21, and therefore plural cable parts can be bound together. That is to say, in the imaging device 100 according to the present embodiment, even in a case where there are plural imaging parts, a plurality of cable parts corresponding to a plurality of imaging parts can be bound together inside the wiring part.

Furthermore, in the imaging device 100 according to the present embodiment, a plurality of cable parts can be bound together inside the wiring part, and therefore a plurality of imaging parts can be disposed along the longitudinal direction of the wiring part. Thus, in the imaging device 100 according to the present embodiment, by changing the shape of the external part of the wiring part in the longitudinal direction, a plurality of imaging parts can be respectively disposed at positions corresponding to imaging positions.

Furthermore, in the imaging device 100 according to the present embodiment, a plurality of cable parts can be bound together inside the wiring part, and therefore by changing the shape of the wiring part, the imaging positions of the plurality of imaging parts can be changed. Thus, in the imaging device 100 according to the present embodiment, by changing the shape of the wiring part, the imaging positions of the plurality of imaging parts can be changed, and therefore the time required for changing the imaging positions can be reduced. Furthermore, in the imaging device 100 according to the present embodiment, by changing the shape of the wiring part, the imaging positions of the plurality of imaging parts can be changed, and therefore by fixing the imaging unit to the ceiling, the time required for changing the imaging positions can be further reduced.

EXAMPLES

Examples of the imaging device of the present invention are described below.

Example 1

An imaging device 100E of example 1 of the present invention is described below.
Configuration of Imaging Device and Disposition of Imaging Parts of Imaging Device The configuration of the imaging device 100E according to the present example is illustrated in FIGS. 1 through 5C. As shown in FIGS. 1 through 5C, the configuration of the imaging device 100E according to the present example is basically the same as the configuration of the imaging device 100 according to the embodiment described above, and therefore the different parts are mainly described below.

Figure 6A:
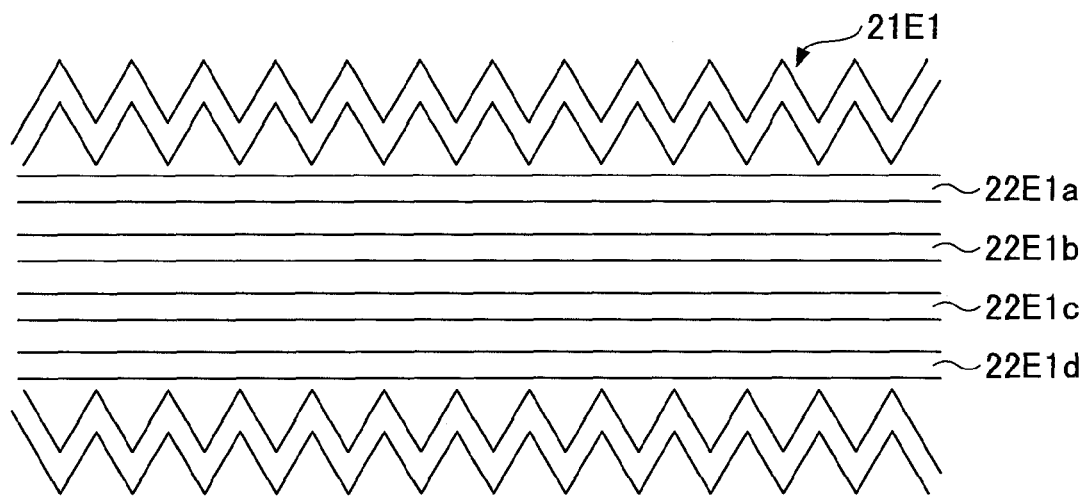
FIGS. 6A and 6B are schematic cross-sectional views of a wiring part of an imaging unit of an imaging device according to example 1 of the present invention.
Figure 6B:
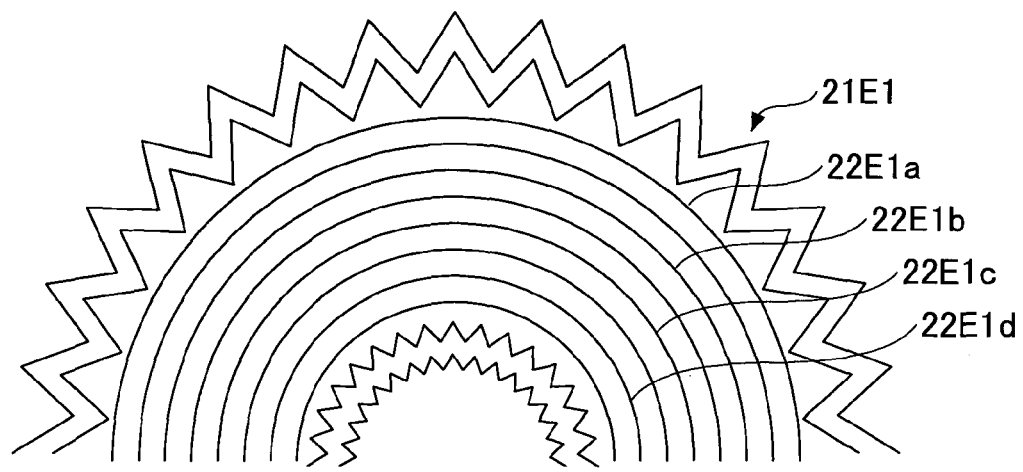

The imaging unit 20 (external part 21E1 of wiring part 21) of the imaging device 100E according to the present example is illustrated in FIGS. 6A and 6B.

As shown in FIG. 6A, the imaging unit 20 of the imaging device 100E according to the present example includes the external part 21E1 (wiring part 21) having a substantially cylindrical accordion shape. Accordingly, in the wiring part 21, by deforming the accordion shape of the external part 21E1, the shape of the external part 21E1 can be changed in accordance with the imaging positions (disposing step). Furthermore, in the imaging unit 20 (imaging device 100E), the accordion shape of the external part 21E1 of the wiring part 21 can be changed in accordance with the imaging positions, and subsequently, the imaging unit 20 can be used to acquire imaging data (imaging step). Furthermore, in the imaging unit 20 (imaging device 100E), cable parts 22E1a-22E1d of the wiring part 21 can be used to transmit the acquired imaging data (transmitting step).

Furthermore, for example, as shown in FIG. 6B, in the wiring part 21, the shape of the external part 21E1 can be changed.

Modification 1 of Example 1

An imaging device of modification 1 of example 1 of the present invention is described below.

The configuration of the imaging device according to the present modification is basically the same as the configuration of the imaging device 100E according to example 1, and therefore the different parts are mainly described.

Figure 7A:
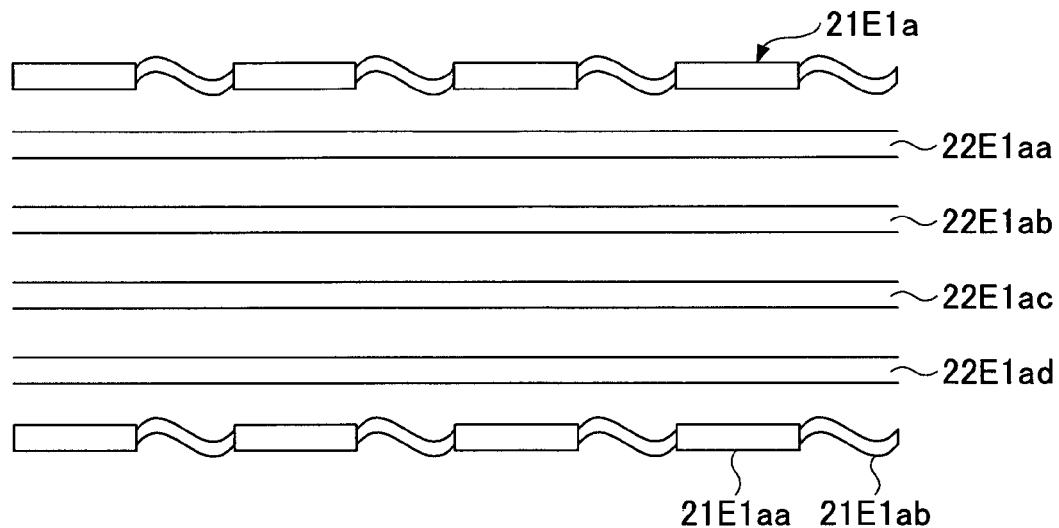
FIGS. 7A and 7B are schematic cross-sectional views of a wiring part of an imaging unit of an imaging device according to modification 1 of example 1 of the present invention.
Figure 7B:
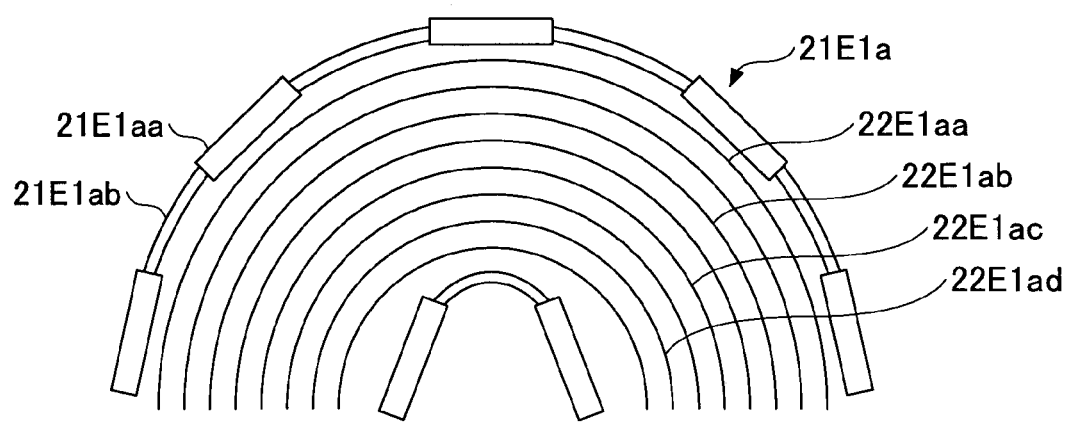

The imaging unit 20 (external part 21E1a of wiring part 21) of the imaging device according to the present modification is illustrated in FIGS. 7A and 7B.

As shown in FIG. 7A, in the present modification, the wiring part 21 of the imaging unit 20 includes a substantially cylindrical external part 21E1a.

The external part 21E1a is constituted by alternately connecting a substantially ring-shaped plastic body 21E1aa and an elastic body 21E1ab. Accordingly, in the wiring part 21, by deforming the elastic body 21E1ab of the external part 21E1a, the shape of the external part 21E1a can be changed in accordance with the imaging positions. In the wiring part 21, for example, the shape of the external part 21E1a can be changed as shown in FIG. 7B.

Modification 2 of Example 1

An imaging device of modification 2 of example 1 of the present invention is described below.

The configuration of the imaging device according to the present modification is basically the same as the configuration of the imaging device 100E according to example 1, and therefore the different parts are mainly described.

Figure 8A:
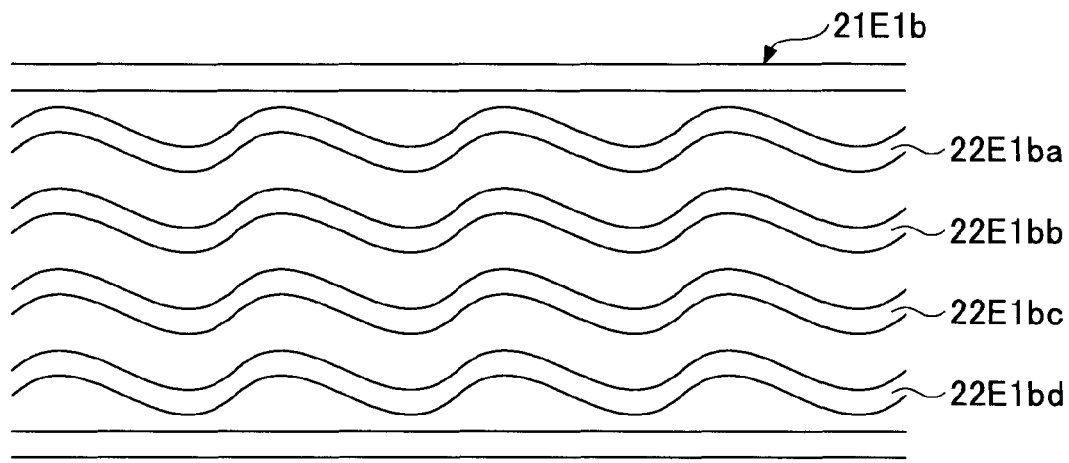
FIGS. 8A and 8B are schematic cross-sectional views of a wiring part of an imaging unit of an imaging device according to modification 2 of example 1 of the present invention.
Figure 8B:
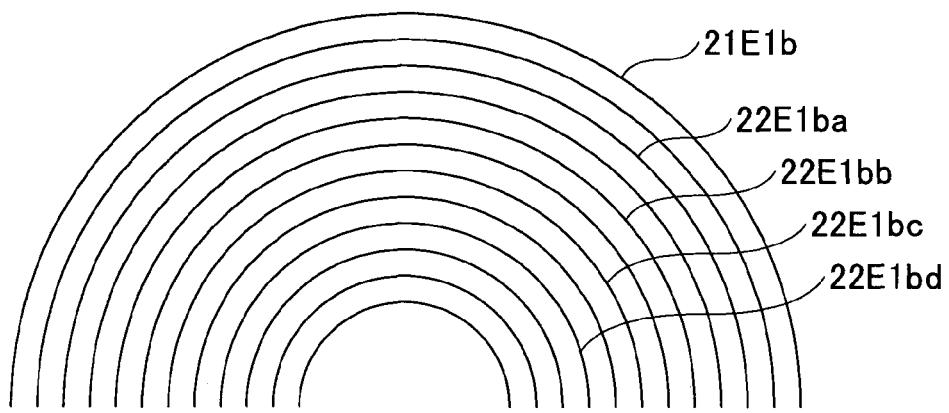

The imaging unit 20 (external part 21E1b of wiring part 21) of the imaging device according to the present modification is illustrated in FIGS. 8A and 8B.

As shown in FIG. 8A, in the present modification, the wiring part 21 of the imaging unit 20 includes a substantially cylindrical external part 21E1b that is deformable. Furthermore, the length in the axial direction of cable parts 22E1ba-22E1bd disposed inside the external part 21E1b is long in accordance with the size of the external part 21E1b in the longitudinal direction. Accordingly, in the wiring part 21, by deforming the external part 21E1b, the shape of the external part 21E1b can be changed in accordance with the imaging positions. In this case, the cable parts 22E1ba-22E1bd disposed inside the external part 21E1b are stretched in accordance with the deformation of the external part 21E1b.

Modification 3 of Example 1

An imaging device of modification 3 of example 1 of the present invention is described below.

The configuration of the imaging device according to the present modification is basically the same as the configuration of the imaging device 100E according to example 1, and therefore the different parts are mainly described.

Figure 9A:
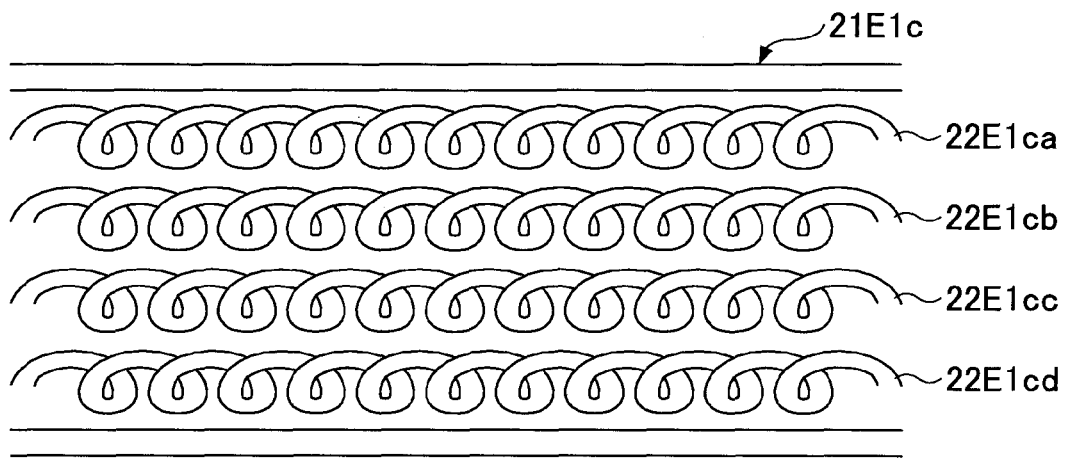
FIGS. 9A and 9B are schematic cross-sectional views of a wiring part of an imaging unit of an imaging device according to modification 3 of example 1 of the present invention.
Figure 9B:
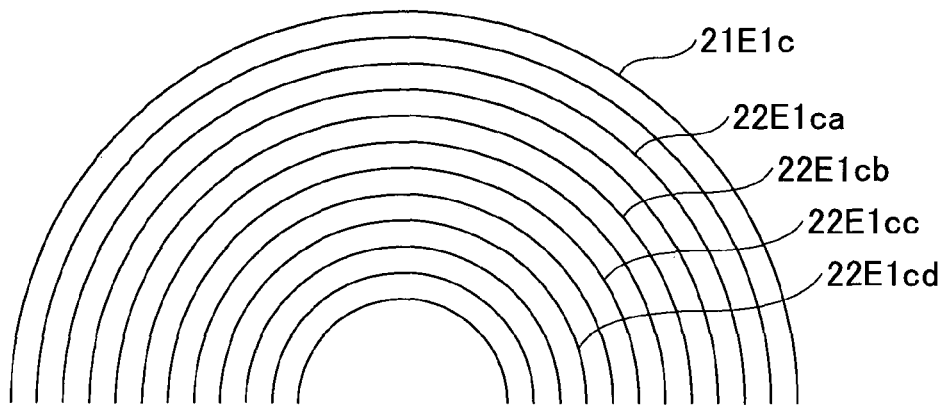

The imaging unit 20 (external part 21E1c of wiring part 21) of the imaging device according to the present modification is illustrated in FIGS. 9A and 9B.

As shown in FIG. 9A, in the present modification, the wiring part 21 of the imaging unit 20 includes a substantially cylindrical external part 21E1c that is deformable. Furthermore, cable parts 22E1ca-22E1cd disposed inside the external part 21E1c have a spiral shape in the longitudinal direction of the external part 21E1c. Accordingly, in the wiring part 21, by deforming the external part 21E1c, the shape of the external part 21E1c can be changed in accordance with the imaging positions. In this case, the cable parts 22E1ca-22E1cd disposed inside the external part 21E1c are stretched in accordance with the deformation of the external part 21E1c.

As described above, with the imaging device 100E according to example 1 of the present invention, the same effects as the imaging device 100 according to an embodiment of the present invention can be achieved.

Example 2

An imaging device 200E of example 2 of the present invention is described below.
Configuration of Imaging Device and Disposition of Imaging Parts of Imaging Device The configuration of the imaging device 200E according to the present example is illustrated in FIGS. 1 through 5C. As shown in FIGS. 1 through 5C, the configuration of the imaging device 200E according to the present example is basically the same as the configuration of the imaging device 100 according to the embodiment described above, and therefore the different parts are mainly described below.

Figure 10:
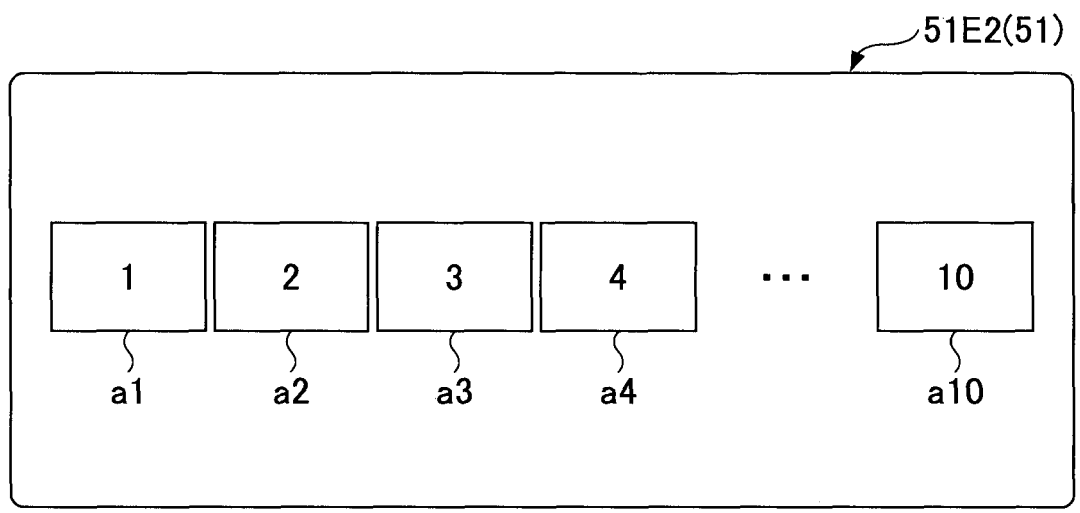
FIG. 10 is a schematic external view of a display unit of an imaging device according to example 2 of the present invention.

A display part 51E2 of a display unit 51 (output unit 50) of the imaging device 200E according to the present example is illustrated in FIG. 10.

As shown in FIG. 10, the display part 51E2 of the imaging device 200E according to the present example displays a plurality of images a1 through a10 corresponding to a plurality of acquired imaging data items in accordance with the imaging positions of the imaging parts 22a-22d (FIG. 2A) of the imaging unit (display step). Accordingly, with the display part 51E2 (imaging device 200E), the user can easily recognize the contents of the images (states of areas that have been imaged) corresponding to the respective imaging positions.

The display part 51E2 (imaging device 200E) may display a plurality of images in a horizontal arrangement, a vertical arrangement, or in a matrix, in accordance with the disposition of the imaging parts.

Modification 1 of Example 2

Modification 1 of example 2 of the present invention is described below.

The configuration of the imaging device according to the present modification is basically the same as the configuration of the imaging device 200E according to example 2, and therefore the different parts are mainly described.

Figure 11A:
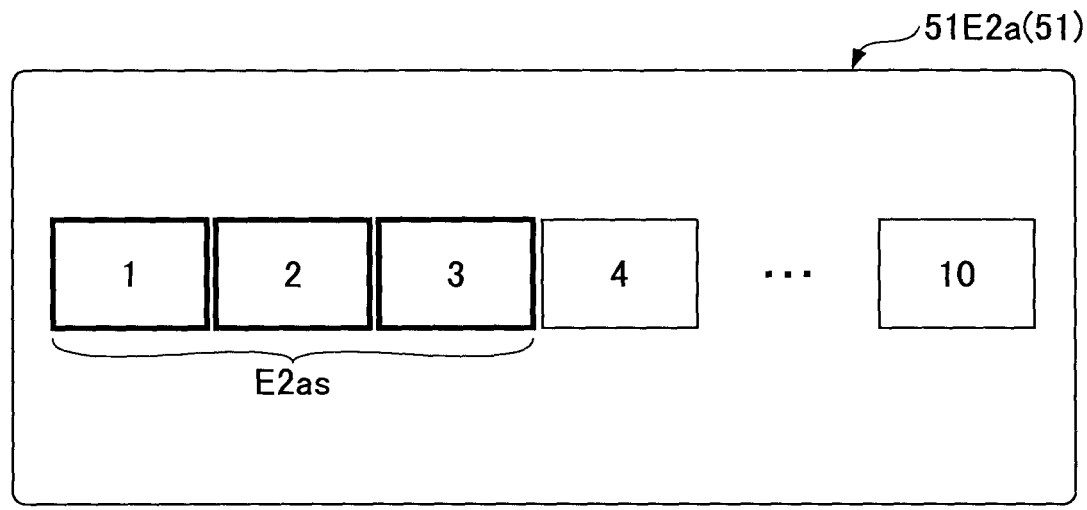
FIGS. 11A and 11B are schematic external views of a display unit of an imaging device according to modification 1 of example 2 of the present invention.
Figure 11B:
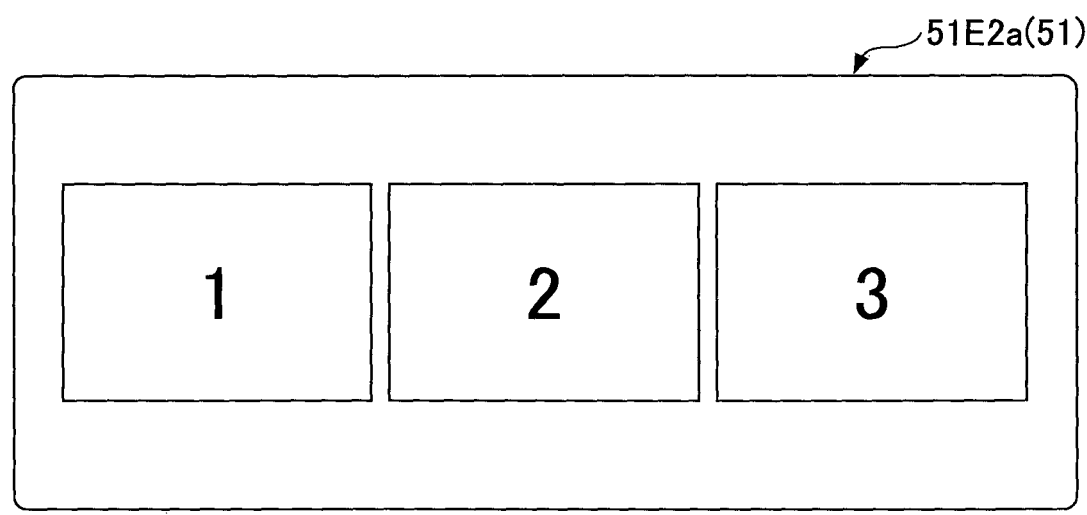

A display part 51E2a of the display unit 51 (output unit 50) according to the present modification is illustrated in FIGS. 11A and 11B.

As shown in FIG. 11A, the display part 51E2a according to the present modification displays a plurality of images corresponding to a plurality of acquired imaging data items in accordance with the imaging positions of the imaging parts 22a-22d (FIG. 2A) of the imaging unit 20 (display step). Furthermore, with the display part 51E2a, the user can select arbitrary images E2as among the displayed plurality of images by using the input unit 40 (selecting step).

Accordingly, as shown in FIG. 11B, the display part 51E2a can display the selected images in an enlarged state. Accordingly, with the display part 51E2a, images desired by the user can be enlarged, and the user can easily recognize the contents of the images (states of areas that have been imaged) corresponding to the respective imaging positions. With the display part 51E2a (imaging device 200E), the user may select a plurality of images of discontinuous positions, and the selected images may be displayed.

Modification 2 of Example 2

Modification 2 of example 2 of the present invention is described below.

The configuration of the imaging device according to the present modification is basically the same as the configuration of the imaging device 200E according to example 2, and therefore the different parts are mainly described.

Figure 12A:
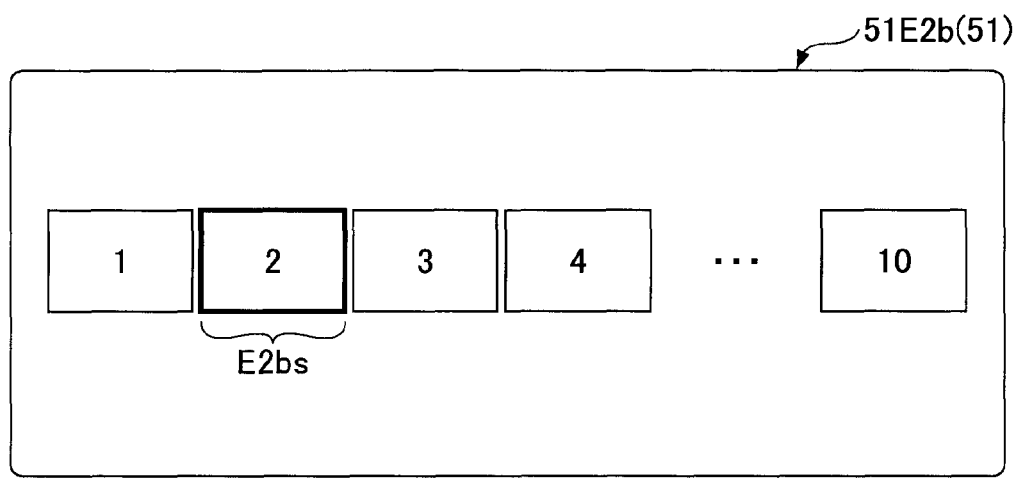
FIGS. 12A and 12B are schematic external views of a display unit of an imaging device according to modification 2 of example 2 of the present invention.
Figure 12B:
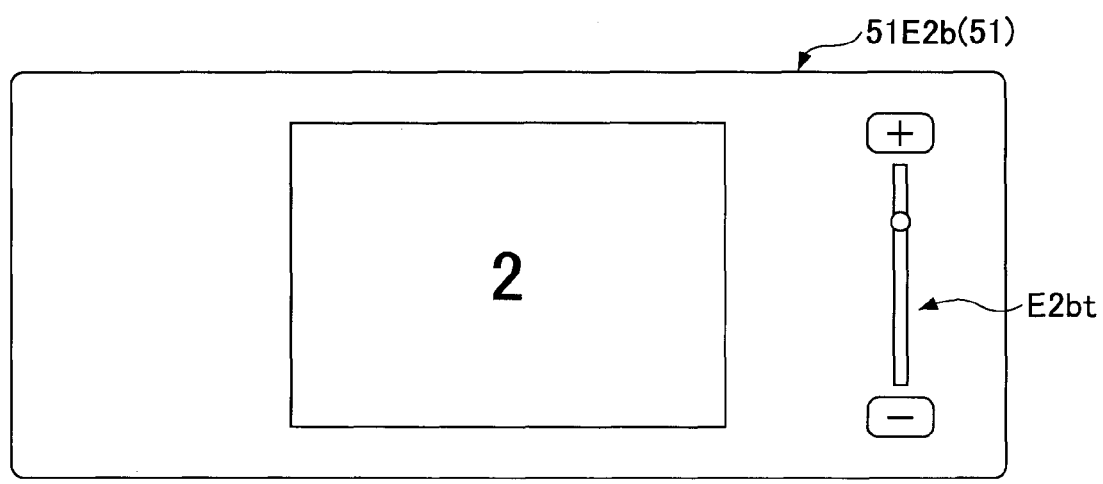

A display part 51E2b of the display unit 51 (output unit 50) according to the present modification is illustrated in FIGS. 12A and 12B.

As shown in FIG. 12A, the display part 51E2b according to the present modification displays a plurality of images corresponding to a plurality of acquired imaging data items in accordance with the imaging positions of the imaging parts 22a-22d (FIG. 2A) of the imaging unit 20 (display step). Furthermore, with the display part 51E2b, the user can select an arbitrary image E2bs among the displayed plurality of images by using the input unit 40 (selecting step). Furthermore, with the display part 51E2*b*, for example, the user can use a size changing bar E2*bt* to enlarge the image to an arbitrary size desired by the user (FIG. 12B).

Accordingly, as shown in FIG. 12B, the display part 51E2*b* (display unit 51) can display the selected image in an enlarged state. Accordingly, with the display part 51E2*b*, an image desired by the user can be enlarged to a size desired by the user, and the user can easily recognize the contents of the images (states of areas that have been imaged) corresponding to the respective imaging positions.

Note that the imaging device 200E may enlarge (reduce) an image to a size desired by the user by a method of controlling the position of the lens of the imaging unit 20 (imaging part) by using the control unit 10 (optical zoom) and/or a method of performing image processing on the image that has been taken (digital zoom).

As described above, with the imaging device 200E according to example 2 of the present invention, the same effects as the imaging device 100 according to an embodiment of the present invention can be achieved.

Example 3

An imaging device 300E of example 3 of the present invention is described below.
Configuration of Imaging Device and Disposition of Imaging Parts of Imaging Device The configuration of the imaging device 300E according to the present example is illustrated in FIGS. 1 through 5C. As shown in FIGS. 1 through 5C, the configuration of the imaging device 300E according to the present example is basically the same as the configuration of the imaging device 100 according to the embodiment described above, and therefore the different parts are mainly described below.

A display part of the display unit 51 (output unit 50) of the imaging device 300E according to the present example is illustrated in FIGS. 13A through 13C.

As shown in FIG. 13A, as the selecting step, the display unit 51 of the imaging device 300E displays a screen (display part 51E3*a*) to which information required for identifying an image (for example, date, location, imaging part) is input, for selecting a past image stored in the storage unit 30. Next, as shown in FIG. 13B, the display unit 51 displays information input by a user (display part 51E3*b*). Subsequently, as shown in FIG. 13C, the display unit 51 displays the selected image (display part 51E3*c*).

Note that to the display unit 51, information relevant to plural images (for example, front and back range) may be input as the information required for identifying a past image.

As described above, with the imaging device 300E according to example 3 of the present invention, the same effects as the imaging device 100 according to an embodiment of the present invention can be achieved.

Furthermore, with the imaging device 300E according to example 3 of the present invention, by using the display unit 51, an image (past image) desired by the user can be displayed, and the user can easily recognize the contents of the images (states of areas that have been imaged) corresponding to the respective imaging positions.

Example 4

An imaging system 400S including an imaging device 400E of example 4 of the present invention is described below.

Figure 14:
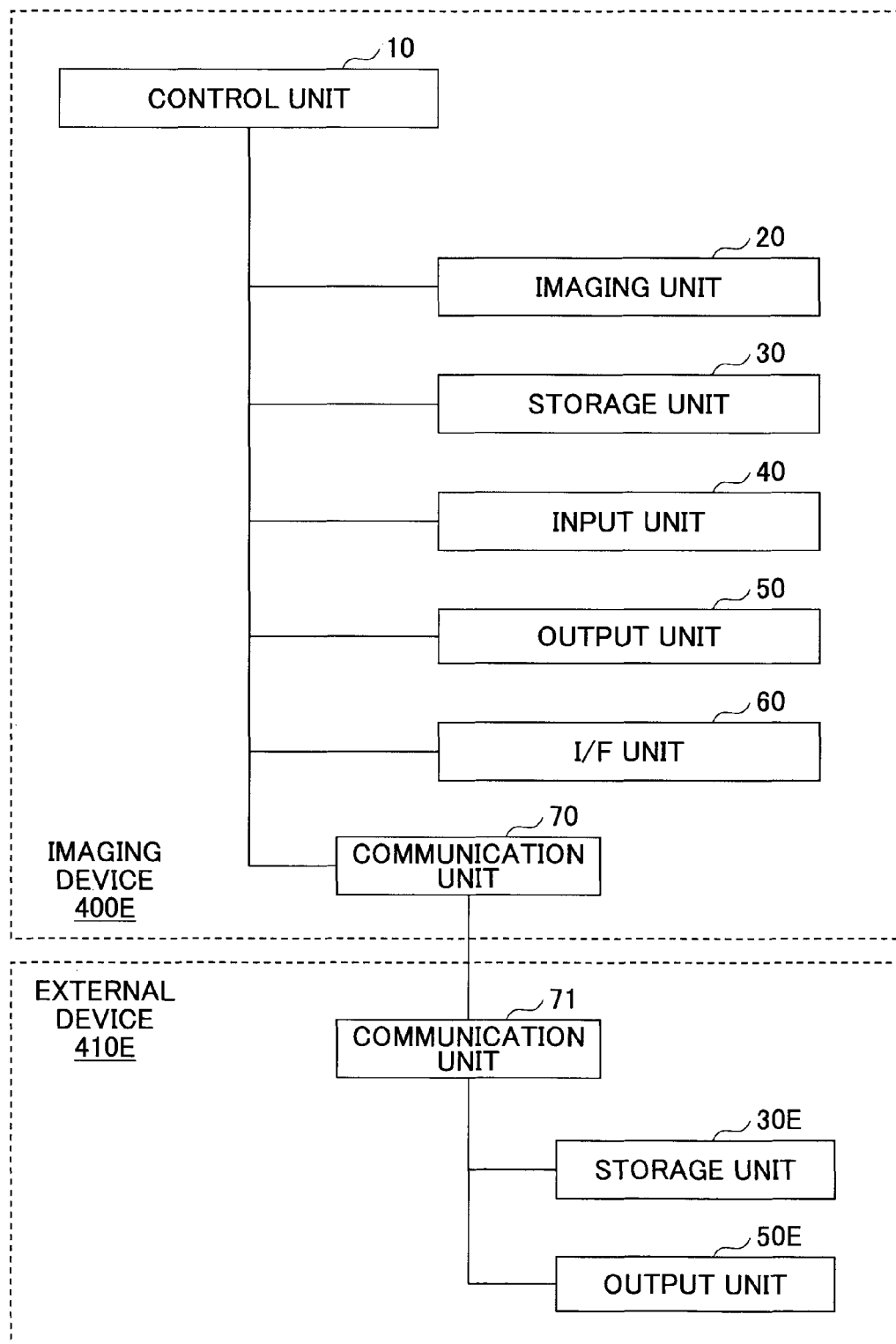
FIG. 14 is a schematic configuration diagram of an imaging system according to example 4 of the present invention.

The imaging system to which the present invention is applicable is not limited to the system described below. That is to say, the imaging system is applicable to any system other than the present example, as long as the system includes an imaging device and a management server for managing information (images, etc.) taken by the imaging device, and bidirectional transmission/reception of information can be performed between the imaging device and the management server in a wired and/or wireless manner.
Configuration of Imaging System FIG. 14 is a schematic diagram of the imaging system according to the present example. The basic configuration of the imaging device 400E according to the present example is the same as the configuration of the imaging device 100 according to the embodiment described above, and therefore the different parts are mainly described below.

As shown in FIG. 14, the imaging system 400S includes the imaging device 400E and an external device 410E.

In the present example, the imaging device 400E further includes a communication unit 70. Furthermore, the external device 410E also includes a communication unit 71. The imaging device 400E and the external device 410E can communicate with each other in a wired and/or a wireless manner with the use of the communication unit 70 and the communication unit 71.

Furthermore, in the imaging device 400E, a unit for acquiring information relevant to sound (for example, a microphone 21Mc in FIG. 15) may be included in the imaging unit 20.

In the present example, the external device 410E includes a storage unit 30E and an output unit 50E. The external device 410E stores information output from the imaging device 400E in the storage unit 30E. Furthermore, the external device 410E can display images using the output unit 50E, based on information output from the imaging device 400E and/or information stored in the storage unit 30E.

Note that a PC, etc., may be used as the external device 410E. Furthermore, the external device 410E may use cloud computing. Furthermore, the external device 410E may include other units such as an input unit of the imaging device 400E.

Accordingly, with the imaging system 400S, the processing amount at the imaging device 400E can be reduced, and therefore the imaging device 400E may be reduced in size and weight and may have a simplified structure.
System Configuration of Imaging System FIG. 15 illustrates a system configuration of the imaging system 400S according to the present example.

Figure 15:
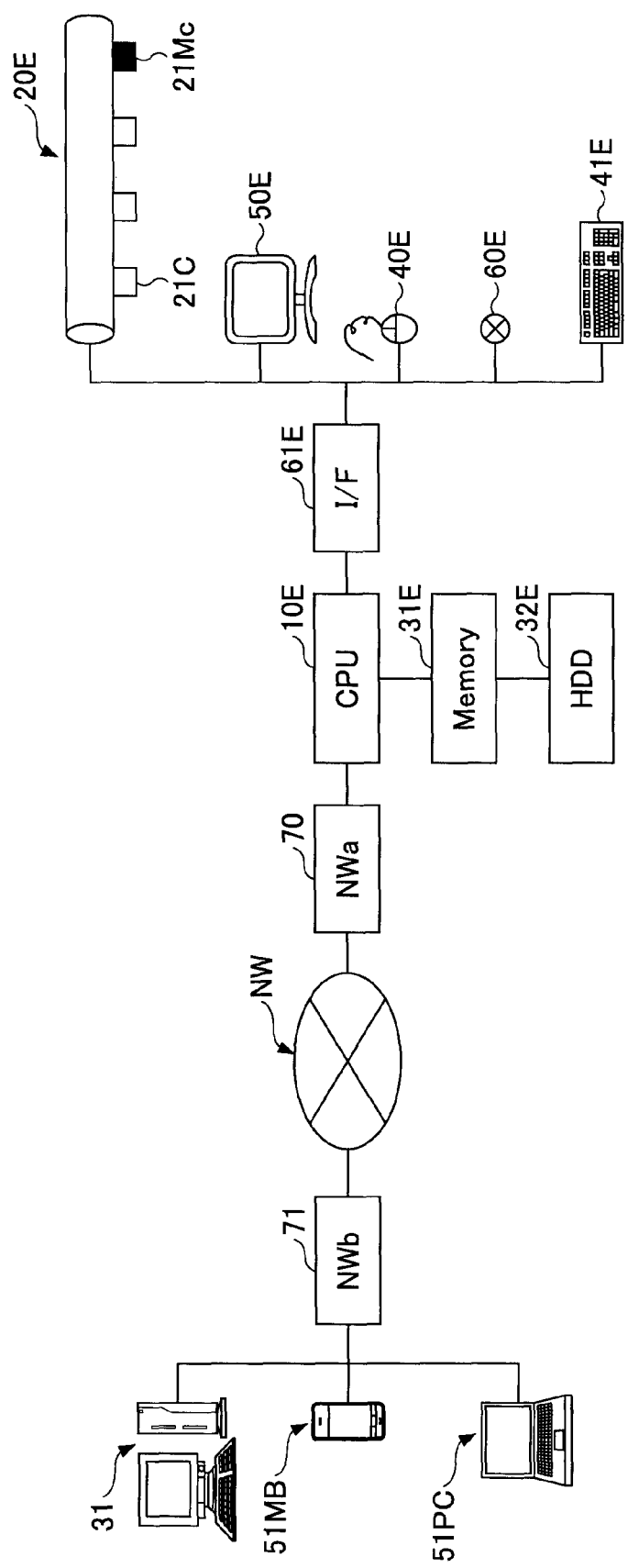
FIG. 15 is a schematic system diagram of an imaging system according to example 4 of the present invention.

As shown in FIG. 15, in the imaging system 400S according to the present example, the imaging device 400E includes a control unit 10E, an imaging unit 20E, storage units 31E, 32E, input units 40E, 41E, an output unit 50E, I/F units 60E, 61E, and the communication unit 70. Furthermore, in the imaging system 400S according to the present example, the external device 410E includes a storage unit 31, an input unit and an output unit 51MB, 51PC, and the communication unit 71.

In the imaging system 400S according to the present example, bidirectional transmission/reception of information can be performed between the imaging device 400E and the external device 410E via the Internet NW, LAN (Local Area Network), etc.

In this case, as the control unit 10E, a CPU built in a PC, etc., may be used. As the storage units 31E, 32E, a memory or a hard disk built in a PC, etc., may be used. As the input units 40E, 41E, a mouse or a keyboard attached to a PC, etc., may be used. As the output unit 50E, a display attached to a PC, etc., may be used. As the I/F units 60E, 61E and the communication unit 70, an interface unit built in a PC, etc., may be used.

Furthermore, as the storage unit 31, a hard disk built in a server, etc., may be used. As the input unit and the output unit 51MB, 51PC, a PC, a notebook computer, a mobile terminal, a mobile phone, a tablet, or other remote image playback means may be used. As the communication unit 71, an interface means built in a server, etc. may be used.

Operations of Imaging System

Operations of the imaging system 400S according to the present example is described with reference to FIG. 16.

As shown in FIG. 16, in step S101, the imaging system 400S according to the present example takes an image of a target with the use of the imaging device 400E, similar to the imaging device 100 according to the embodiment.

Subsequently, the imaging system 400S proceeds to step S102.

Next, in steps S102 through S104, the imaging system 400S uses the communication units 70, (FIG. 15) to send imaging data to the external device 410E (storage unit 31) (step S102). The external device 410E receives imaging data (step S103). In this case, the external device 410E uses the output units 51MB, 51PC to display images corresponding to the time series based on the imaging data received in time series (for example, streaming) (step S104). Accordingly, the external device 410E (imaging system 400S) can make the user recognize the imaging results (image, video) in a real-time manner.

After starting the display, the imaging system 400S proceeds to step S105.

In steps S105 and S106, the imaging system 400S stores the imaging data received at step S103 in the storage unit 31 of the external device 410E. In this case, the storage unit 31 creates a plurality of saving files (storage files) corresponding to the imaging conditions (imaging part (camera), date, location, etc.) (assigns a storage area for saving) (step S105), and respectively saves the plurality of imaging data items in the plurality of saving files (step S106).

After starting the saving, the imaging system 400S proceeds to step S107.

In step S107, when a signal for cancelling the saving of the imaging data is received from the imaging device 400E, the imaging system 400S proceeds to step S111. Otherwise, the imaging system 400S proceeds to step S108.

In step S108, the imaging system 400S determines whether a predetermined time has elapsed since imaging has started in step S101. When the imaging system 400S determines that a predetermined time has elapsed, the imaging system 400S proceeds to step S109. Otherwise, the imaging system 400S returns to step S107. In this case, the predetermined time may be a value that is defined in advance based on experiments or by calculation.

In step S109, the imaging system 400S determines whether the free space in the storage unit (space where information can be stored) is less than or equal to a predetermined space. When the imaging system 400S determines that the free space is not less than or equal to a predetermined space, the imaging system 400S proceeds to step S112. Otherwise, the imaging system 400S proceeds to step S110.

In step S110, the imaging system 400S makes it possible to overwrite the saving file saving imaging data in the storage unit 31 (step S106). Subsequently, when the saving file can be overwritten, the imaging system 400S proceeds to step S113. Otherwise, the imaging system 400S proceeds to step S111.

In step S111, the imaging system 400S cancels the saving of the imaging data at step S106 and cancels the displaying of the image at step S104.

After the cancelling, the imaging system 400S proceeds to END in FIG. 16, and ends the operation of taking an image of the target.

Meanwhile, in step S112, the imaging system 400S creates a new saving file in the area relevant to the free space of the storage unit 31.

After creating the new saving file, the imaging system 400S proceeds to step S106.

In step S113, the imaging system 400S deletes the saving file created at step S106.

After deleting the saving file, the imaging system 400S returns to step S106.

As described above, with the imaging system 400S according to example 4 of the present invention, the same effects as the imaging device 100 according to an embodiment of the present invention can be achieved.

Furthermore, with the imaging system 400S according to the present example, compared to the case where the imaging device is provided with a storage unit and an output unit, etc., the imaging device (400E) can be made compact, and the load of the imaging device can be reduced. Therefore, an advantageous effect can be achieved in terms of reducing the cost of the imaging device.

According to an embodiment of the present invention, plural imaging parts can be disposed in accordance with plural imaging positions, in a case of taking plural images with the plural imaging parts.

The imaging device, the imaging system, and the imaging method are not limited to the specific embodiments described herein, and variations and modifications may be made without departing from the scope of the present invention.

The present application is based on and claims the benefit of priority of Japanese Priority Application No. 2012-115532 filed on May 21, 2012, the entire contents of which are hereby incorporated by reference.

The invention claimed is:

1. An imaging device comprising:
an imaging unit configured take a plurality of images, the imaging unit including
a plurality of imaging parts each configured to acquire an imaging data item relevant to one of the plurality of images taken, and
a wiring part configured to transmit a plurality of the imaging data items acquired by the plurality of imaging parts, wherein
the wiring part includes
an external part forming an outline of the wiring part, the external part being deformable, and
a cable part disposed inside the external part, wherein
the plurality of imaging parts are disposed inside the external part along a longitudinal direction of the wiring part, and
the imaging unit is configured to acquire the plurality of the imaging data items corresponding to a plurality of imaging positions, and transmit the plurality of the imaging data items by using the cable part,
wherein the plurality of imaging parts are respectively disposed at the plurality of imaging positions by deforming a shape of the external part in the longitudinal direction.

2. The imaging device according to claim 1, wherein
the external part has an accordion shape having a tubular form, and
in the wiring part, the accordion shape of the external part is deformed to change a shape of the external part in accordance with the imaging positions.

3. The imaging device according to claim 1, wherein
the external part has an outline having a substantially cylindrical shape,
the substantially cylindrical shape is constituted by alternately connecting a plastic body that is substantially ring-shaped and an elastic body, and
in the wiring part, the plastic body of the external part is deformed to change a shape of the external part in accordance with the imaging positions.

4. The imaging device according to claim 1, wherein
a length of the cable part in an axial direction is made long in accordance with a size of the external part in a longitudinal direction.

5. The imaging device according to claim 4, wherein
the cable part has a spiral shape in the longitudinal direction of the external part.

6. The imaging device according to claim 1, wherein
each of the plurality of the imaging parts has an optical zoom mechanism.

7. The imaging device according to claim 1, further comprising:
a display unit configured to display at least one of the plurality of images based on at least one of the plurality of the imaging data items acquired by at least one of the plurality of imaging parts.

8. The imaging device according to claim 7, wherein
the display unit displays, on a display part of the display unit, the plurality of images taken so as to be disposed in accordance with the plurality of imaging positions.

9. The imaging device according to claim 7, further comprising:
a recording unit configured to store at least one of the plurality of the imaging data items acquired by at least one of the plurality of imaging parts, wherein
the display unit displays at least one of the plurality of images by using at least one of the imaging data items stored in the recording unit.

10. The imaging device according to claim 7, wherein
the display unit communicates with the imaging unit in a wired and/or wireless manner.

11. An imaging method comprising:
disposing a plurality of imaging parts in an external part forming an outline of a wiring part in a longitudinal direction of the wiring part, wherein the external part is deformable, and a cable part is disposed inside the external part;
changing a shape of the external part and a shape of the wiring part in the longitudinal direction, so that the plurality of imaging parts are respectively disposed at a plurality of imaging positions;
acquiring a plurality of imaging data items corresponding to the plurality of imaging positions by using the plurality of imaging parts; and
transmitting the plurality of imaging data items that have been acquired by using a cable part built in the wiring part.

12. A non-transitory computer-readable recording medium storing a program that causes a computer to execute the imaging method according to claim 11.

* * * * *